United States Patent [19]
Maciejewski et al.

[11] Patent Number: 5,449,331
[45] Date of Patent: Sep. 12, 1995

[54] ELECTRONIC CLUTCH MANAGEMENT SYSTEM FOR MOTOR VEHICLES WITH INTERNAL COMBUSTION ENGINES

[75] Inventors: Boguslaw Maciejewski, Werdohl; Jorg Holwe, Hemer; Josephus H. G. Delvigne, Werdohl, all of Germany

[73] Assignee: LUK Lamellen und Kupplungsbau GmbH, Buhl, Germany

[21] Appl. No.: 97,836

[22] Filed: Jul. 26, 1993

[30] Foreign Application Priority Data

Jul. 27, 1992 [DE] Germany ............... 42 24 751.9

[51] Int. Cl.⁶ .......................................... B60K 41/02
[52] U.S. Cl. ........................................ 477/175; 477/78; 477/86; 477/906
[58] Field of Search ............... 477/66, 86, 78, 174, 477/175, 906

[56] References Cited

U.S. PATENT DOCUMENTS

| | | | |
|---|---|---|---|
| 4,403,682 | 9/1983 | Norris et al. | 477/175 |
| 4,449,617 | 5/1984 | Sakakiyama et al. | 477/175 |
| 4,872,540 | 10/1989 | Sekine et al. | 477/175 X |
| 5,094,333 | 3/1992 | Mimura | 477/174 X |
| 5,190,130 | 3/1993 | Thomas et al. | 477/174 X |
| 5,291,803 | 3/1994 | Yamaguchi | 477/906 X |

FOREIGN PATENT DOCUMENTS 2079888  1/1982  United Kingdom ............. 477/175

*Primary Examiner*—Andrea L. Pitts
*Attorney, Agent, or Firm*—Darby & Darby

[57] ABSTRACT

An electronic clutch management system for motor vehicles with engines having butterfly valves. An actuator under the control of a micro-controller activates a clutch between the engine and a transmission as a function of an ECM sensor which senses the position of the butterfly valve. If the micro-controller breaks down or is disturbed in its function, the micro-controller control is switched off, and control of the actuator element is switched over from the micro-controller to a comparator which is driven directly by the ECM sensor and controls the actuator element to activate the clutch, i.e., into its disengaged or engaged position, in a sense opposite to the position of the butterfly valve.

12 Claims, 1 Drawing Sheet

ELECTRONIC CLUTCH MANAGEMENT SYSTEM FOR MOTOR VEHICLES WITH INTERNAL COMBUSTION ENGINES

BACKGROUND OF THE INVENTION

The invention relates to an electronic clutch management system for motor vehicles with internal combustion engines. In such a system, a micro-controller, in dependence on an ECM ("Electronic Clutch Management") sensor mechanism which senses the current position of the butterfly valve of the internal combustion engine, drives an actuator element to actuate a clutch disposed between the internal combustion engine and a transmission. In the system, the function of the micro-controller is continuously monitored and, if the function of the micro-controller should fail or be disturbed, the system is turned off.

Electronic clutch management systems of this type and intended for this purpose are well known and established. However, in such a system improper operation or even complete failure of the electronic control can never be excluded with complete certainty. In such circumstances, clutch activations can occur, which may be unsuited to the particular operating situation or even contrary to it.

BRIEF DESCRIPTION OF THE INVENTION

In view of these inadequacies of the prior art, the invention provides an improved electronic clutch management system of the type, and for the intended purpose explained in the introduction, in which clutch activations contrary to the prevailing operating situation are effectively prevented.

This object of the invention is achieved with the electronic clutch management system by a safety logic circuit with a switch-over device for switching over the actuator element when the micro-controller is disturbed. The system uses a comparator, which is driven directly by the ECM sensor mechanism, which senses the position of the butterfly valve. The comparator on its part, in dependence on the position of the butterfly valve, drives the actuator element for actuating the clutch in its disengaging or engaging position, in a manner that is opposed to the current position of the butterfly valve.

In accordance with the invention, if the control electronics should be disturbed or fail, the actuator element is driven directly by the comparator, and specifically in such a fashion that, if the butterfly valve is in its open position, the clutch engages, but if the butterfly valve is in its closed position, the clutch disengages. In this way, the invention meets the different requirements of the two indicated operating conditions in the fashion that, if the control electronics are disturbed or fail, the clutch is activated to place the vehicle in a safe condition in each of these operating states.

If the control electronics are disturbed or fail during a driving operation, which is indicated by an open butterfly valve, the clutch goes into its engaged position. This measure is especially important if the disturbance occurs during a vehicle passing maneuver. On the other hand, a closed butterfly valve indicates engine operation at an idle condition while the vehicle is stationary. In this event, the safety logic circuit reacts to the appearance of disturbances or of a breakdown of the control electronics by disengaging the clutch. Thus, according to the invention, the clutch frictional connection is maintained during acceleration, for instance when passing, while an undesired spontaneous starting of the vehicle is effectively prevented while the vehicle is stationary.

A modification of the invention provides that a monitoring electronic system is connected via an RST-line to the micro-controller and continuously receives defined signals from the latter. In the absence of these RST signals, which indicate the functionality of the micro-controller, the switch-over device is activated and thus causes the control of the actuator element to be switched over from the micro-controller to the comparator. In particular, the monitoring electronic system immediately switches the actuator element over to comparator operation if the defined signals of the micro-controller fail to arrive. Accordingly, if the butterfly valve is in its open position, the clutch is held or brought into its engaged position. On the other hand, if the butterfly valve is closed, that is, such as when the internal combustion engine is idling, the clutch is held or brought into its disengaged position.

According to a further development of the above modification, the micro-controller and the monitoring electronic system are connected together not only by the RST line but also by a RESET line. The system also has "off" outputs, and the latter are applied as inputs to an OR gate, which on its part, in dependence on the logical state of the "off" outputs of the micro-controller and of the monitoring electronic system, directs the switch-over device to switch the control of the actuator element over from the micro-controller to the comparator.

This further feature thus involves an arrangement in which the OR gate responds if different logical states appear at the "off" outputs of the micro-controller and the monitoring electronic system, or if one of all three "off" outputs request a switchover to comparator control. This is always the case when the monitoring electronic system resets the micro-controller via the RESET line in the absence of signals which indicate the functional capability of the micro-controller.

Another important feature of the invention is one wherein the safety logic circuit has a monitoring processor, which is supplied with information from the ECM sensor device in the same fashion as the micro-controller. The monitoring processor provides signals which indicate its functionality to the monitoring electronic system via an RST line, so that if these signals are absent, the monitoring electronic system drives the switch-over device to switch the actuator element over from the micro-controller to the comparator.

The point of this feature thus is that a monitoring processor is deployed in addition to monitoring the micro-controller by means of the monitoring electronic system. Just like the micro-controller, this monitoring processor is directly supplied with information from the ECM sensor system.

According to a further feature of this modification, the micro-controller and the monitoring processor are connected together through a special "COM" interface and exchange information through this interface. According to another development of this modification, the monitoring electronic system is also connected to the micro-controller and the monitoring processor via RST (Restart) and RESET-lines. The micro-controller, the monitoring electronic system, and the monitoring processor are each equipped with an "off" output, and these outputs are applied as inputs to an OR gate which on its part, in dependence on the logical state of the above outputs of the micro-controller, the monitoring electronics, and/or the monitoring processor, drives the switch-over device to switch the actuator element over from the micro-controller to the comparator.

BRIEF DESCRIPTION OF THE DRAWINGS

Two embodiments of the invention will be explained below by way of the attached drawings. In schematic views, the drawings show the following.

DETAILED DESCRIPTION OF THE INVENTION

Figure 1:
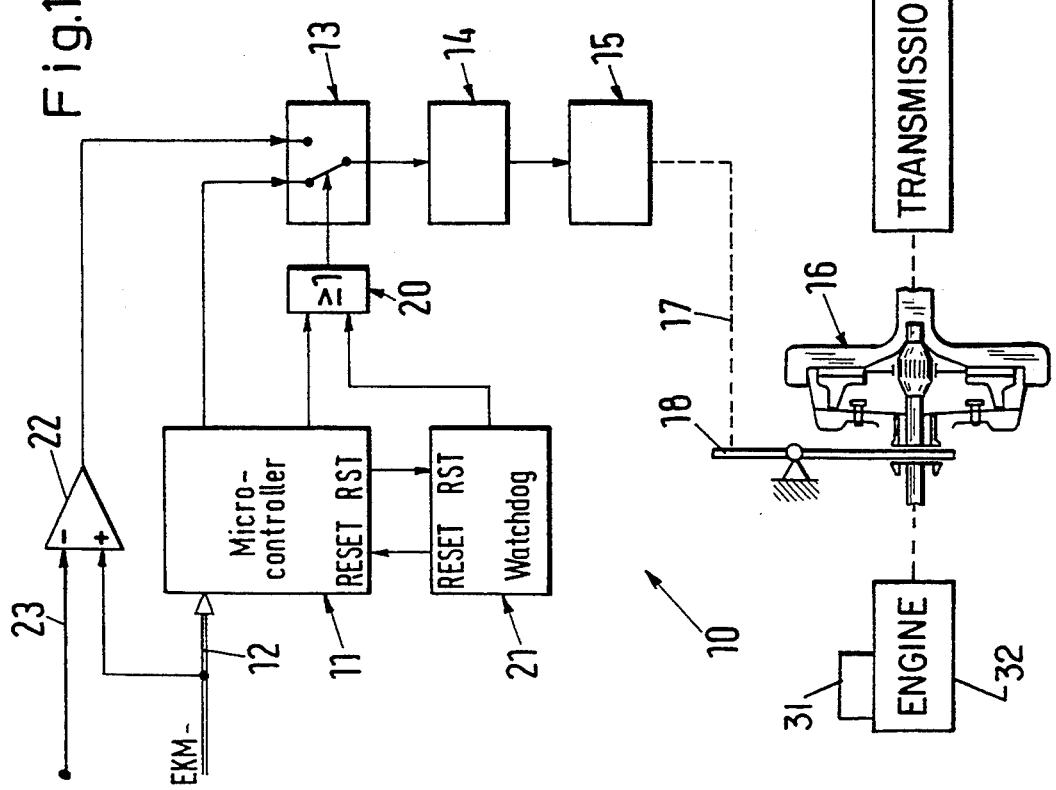
FIG. 1 shows an electronic clutch management system with a first embodiment of the inventive safety logic circuit.

In the electronic clutch management system 10, which is presented in FIG. 1, a micro-controller 11 ("microprocessor") controls the vehicle clutch 16 in response to information furnished by an ECM sensor system 12 which monitors, among other things: engine RPM sensors; transmission RPM sensors; clutch displacement; speed detection; and the throttle valve position. This control is effected through a switch-over device 13, a final stage 14, and an actuator element 15. The mechanical linkage is indicated by the dashed line 17 from the actuator element 15 to a disengagement lever 18 on the clutch. Further, the electronic clutch management system comprises an OR gate 20 and a monitoring electronic system 21 to which defined signals which run from the micro-controller 11 through the RST line are delivered. The RST (restart) signals in the micro-controller 11 are standard signals relative to its operation. The micro-controller 11 and the monitoring electronic system 21 have their "off" outputs connected as inputs to the OR gate 20. The "off" output of the micro-controller assumes a particular logical state depending upon its operating state. Furthermore, the monitoring electronic system 21 and micro-controller 11 are connected together through a Reset line over which the monitor 21 can send signals to the micro-controller.

The RST signal is a signal with which the monitoring system can be triggered. The RST signal can be of various forms depending on the application, from a simple switching signal via a defined sequence of signals up to extensive data transfer.

If the RST signal is not sent from the processor at definite time intervals, the monitoring system generates a reset signal, by which the processor is switched off or restarted. In this case the control of the actuator 15 is then taken over by the comparator 22. The monitoring of a microprocessor by a monitoring system per se is conventional in computer technology.

If the micro-controller 11 breaks down or is disturbed, it no longer delivers defined values to the monitoring electronic system 21 via the RST line. In this case, the monitoring electronic system 21 changes its "off" output (e.g., from a logic 0) which is connected to the OR gate 20 to another logical state (e.g., to a logic 1) and resets the micro-controller 11. Of course, the opposite logic levels can be used, as is well known. By way of the OR gate 20, this causes the switch-over device 13 to switch over. As a result, the final stage 14 and the actuator element 15 are switched over from control by the micro-controller 11 to control by the comparator 22. The latter, acting through the final stage 14, now drives the actuator element 15 to activate the clutch 16 as a function of the information supplied by the ECM sensor system 12 concerning the position of the butterfly valve 31.

The comparator 22, which is basically an operational amplifier type device, has a threshold voltage set input 23 and an input from the ECM sensor system 12 that provides information about the respective position of the butterfly valve 31. The comparator 22 distinguishes only between the "open" or "closed" position of the butterfly valve. The threshold is exceeded when the butterfly valve is open. Accordingly, if the micro-controller 11 is disturbed or disabled, the comparator 22, acting through the final stage 14 and the actuator element 15, controls the activation of the clutch 16 in its engaged position when the butterfly valve is open and respectively in its disengaged position when the butterfly valve is closed.

Maintenance of the clutch friction connection is thus guaranteed when the control electronics are disturbed or disabled during driving operation. Disengagement of the clutch friction connection is also guaranteed when the vehicle is stationary and the engine 32 is at idling speed, in view of the disengaged position of the clutch which prevails under these circumstances.

Figure 2:
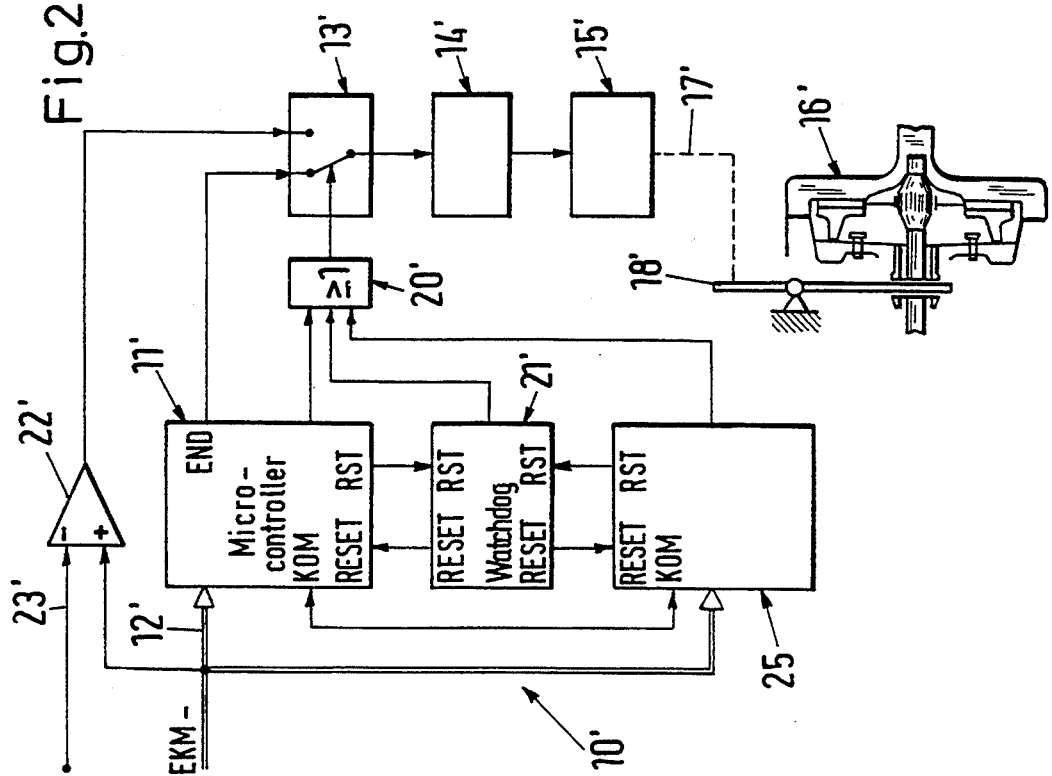
FIG. 2 shows an electronic clutch management system with a safety logic circuit that has been developed further by using a monitoring processor.

In FIG. 2, the same reference symbols are used for the same parts as in FIG. 1, but they are identified by an apostrophe for distinction.

The embodiment of FIG. 2 differs from that of FIG. 1 as explained above by the feature that a special monitoring processor 25 is provided in addition to the monitoring electronic system 21'. The micro-controller 11' is supplied with information from the ECM sensor system 12'. Through its RST input, the monitor 21' checks the function of the micro-controller 11'. Furthermore, the micro-controller 11' and the monitoring processor 25 exchange information over a separate "COM" interface.

In normal operation, that is without disturbances or break-down of the control electronics, the "off" outputs of the micro-controller 11', the monitoring electronic system 21', and of the monitoring processor 25, which are connected to the three inputs of the OR gate 20', are at the same logic level and the OR gate has no output change. Accordingly, the actuator element 15' is driven to activate the vehicle clutch 16' by the microcontroller 11' via the switch-over device 13' and the final stage 14'. On the other hand, if contradictions occur in the functional analysis or in the exchanged information, the system is switched off from the micro-controller 11' or the monitoring processor 21' through the changed logic level of one or more of the "off" outputs. As in the case of the first embodiment, control is then effected as a function of the position of the butterfly valve, through the comparator 22', which is connected to the ECM sensor system.

In the embodiment of FIG. 2, the monitoring electronic system 21 monitors both the micro-controller 11 and the monitoring processor 25. It functions in such a fashion that, if defined signals fail to arrive from the micro-controller 11' or from the monitoring processor 25 via the RST lines, the respective control electronics is reset, with the consequence that the enabling logical state for the OR gate 20' appears at its output. Through the OR gate 20', this then again causes the control electronics to switch over to the comparator 22', which then controls activation of the vehicle clutch 16 through the actuator element 15.

While the present invention has been shown and described with respect to preferred embodiments, thereof, it will be appreciated by those skilled in the art that various changes can be made while still coming within the spirit and scope of the invention which is defined by the following claims.

What is claimed is:

1. An electronic management system for a clutch located between an engine with a butterfly valve and a transmission of a vehicle, comprising:
   clutch activating means having an input,
   sensor means for sensing the status of the operating position of the engine butterfly valve and producing a sensor signal in response thereto,
   controller means receiving as an input the sensor signal and having an output for controlling said clutch activating means,
   direct means having an output for directly operating said clutch activating means in response to the sensor signal so as to engage the clutch when the butterfly valve is opened and to disengage the clutch when it is closed, and
   switchover means for selectively connecting one of the outputs of said controller means and said direct means to the input of said clutch activating means, said switchover means being responsive to a disturbance in the operation of said controller means to switch the input of said clutch activating means from said controller means to said direct means.

2. A system as in claim 1 further comprising means for monitoring the operation of said controller means and for causing such switchover means to permit direct operation of said clutch activating means by said direct means in response to the sensor signal when said monitoring means detects a disturbance in the operation of said controller means.

3. A system as in claim 2 wherein the controller means produces proper operating signals indicating proper operation, which, proper operating signals are transmitted to said monitoring means, and said monitoring means operates said switchover means in response to the absence of such proper operating signals.

4. A system as in claim 3 wherein said proper operating signals are restart signals of said controller.

5. A system as in claim 3 wherein said monitor means provides reset signals to said controller means.

6. A system as in claim 3 wherein each of said controller means and said monitor means has an off status output for providing an enabling signal, and further including OR circuit means having an output and having inputs connected to said off status outputs, the output of said OR circuit controlling said switchover means in response to an enabling signal received from any one of said off status outputs.

7. A system as in claim 2 wherein said controller means produces proper operating signals indicating proper operation, and further comprising a second monitor means having the sensor signal as an input, said second monitor means producing proper operating signals indicating its proper operating status as an input to said monitor means and receiving said controller means proper operating signals, said controller means operating said switchover means in response to the absence of the proper operating signals from said second monitor means and said second monitor means operating said switchover means in response to the absence of the proper operating signals from said controller means.

8. A system as in claim 7 wherein each of said controller means, monitor means and said second monitor means has an off status output, and further including OR circuit means having said off status outputs as inputs, the output of said OR circuit controlling said switchover means in response to an enabling signal received from any one of said off status outputs.

9. A system as in claim 3 further comprising:
   a second monitor means having the sensor signal as an input, said second monitor means producing proper operating signals indicating its proper operating status to an input of said monitor means and receiving said controller means proper operating signals, said controller means operating said switchover means in response to the absence of the proper operating signals of said second monitor means and said second monitor means operating said switchover means in response to the absence of the proper operating signals of said controller means; and
   OR circuit means for operating said switchover means, said second monitor means having an "off" status output for providing an enabling signal, such off status output being connected as an input to said OR circuit to operate said switchover means in response to an enabling signal at the off status output of such monitor means.

10. A system as in claim 7 further comprising means for providing communication between said controller means and said second monitor means.

11. A system as in claim 9 further comprising means for providing communication between said controller means and said second monitor means.

12. A system as in claim 1 wherein said direct means is a comparator which compares the sensor signal to a predetermined reference and provides an output in response to the comparison for directly operating said clutch activating means.

* * * * *